(12) United States Patent
Heim

(10) Patent No.: US 8,589,921 B2
(45) Date of Patent: *Nov. 19, 2013

(54) METHOD AND SYSTEM FOR TARGET HOST OPTIMIZATION BASED ON RESOURCE SHARING IN A LOAD BALANCING HOST AND VIRTUAL MACHINE ADJUSTABLE SELECTION ALGORITHM

(75) Inventor: Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 459 days.

This patent is subject to a terminal disclaimer.

(21) Appl. No.: 12/627,943

(22) Filed: Nov. 30, 2009

(65) Prior Publication Data

US 2011/0131570 A1    Jun. 2, 2011

(51) Int. Cl.
*G06F 9/455* (2006.01)
*G06F 9/46* (2006.01)

(52) U.S. Cl.
USPC .............................................. 718/1; 718/105

(58) Field of Classification Search
USPC ....................................................... 718/1, 105
See application file for complete search history.

(56) References Cited

U.S. PATENT DOCUMENTS

| | | | |
|---|---|---|---|
| 7,203,944 B1 | 4/2007 | van Rietschote et al. | |
| 7,444,459 B2 | 10/2008 | Johnson | |
| 7,673,113 B2 | 3/2010 | Sugumar et al. | |
| 7,716,667 B2 | 5/2010 | van Rietschote et al. | |
| 7,730,486 B2 | 6/2010 | Herington | |
| 8,140,812 B2 | 3/2012 | Arroyo et al. | |
| 8,161,475 B2 | 4/2012 | Araujo et al. | |
| 8,209,687 B2 | 6/2012 | Yuyitung et al. | |
| 2005/0268298 A1 | 12/2005 | Hunt et al. | |
| 2006/0069761 A1 | 3/2006 | Singh et al. | |
| 2007/0130566 A1 | 6/2007 | van Rietschote et al. | |
| 2007/0169121 A1 | 7/2007 | Hunt et al. | |
| 2007/0214456 A1 | 9/2007 | Casey et al. | |
| 2007/0271560 A1* | 11/2007 | Wahlert et al. | 718/1 |
| 2008/0184229 A1* | 7/2008 | Rosu et al. | 718/1 |
| 2008/0295096 A1* | 11/2008 | Beaty et al. | 718/1 |
| 2009/0070771 A1* | 3/2009 | Yuyitung et al. | 718/105 |
| 2010/0005465 A1* | 1/2010 | Kawato | 718/1 |
| 2010/0050180 A1* | 2/2010 | Amsterdam et al. | 718/104 |
| 2010/0257523 A1 | 10/2010 | Frank | |

(Continued)

OTHER PUBLICATIONS

Galvin, Peter Baer, "VMware vSphere Vs. Microsoft Hyper-V: A Technical Analysis," Corporate Technologies, CTI Strategy White Paper, 2009, 32 pages.

(Continued)

*Primary Examiner* — Thomas Lee
*Assistant Examiner* — Terrell Johnson
(74) *Attorney, Agent, or Firm* — Lowenstein Sandler LLP

(57) ABSTRACT

A mechanism for target host optimization in a load balancing host and virtual machine (VM) selection algorithm is disclosed. A method of embodiments of the invention includes determining that one or more collected metrics have triggered a load balancing operation of a host controller machine, identifying a plurality of source host machines and a plurality of virtual machines (VMs) hosted by the plurality of source host machines as candidates for selection by the load balancing operation for migration, and adjusting a selection score for at least one of a candidate source host machine and a candidate VM based on one or more metrics of the candidate source host and of the candidate VM, wherein the one or more metrics are associated with one or more candidate target host machines to which a candidate VM could be migrated.

20 Claims, 5 Drawing Sheets

(56) References Cited

U.S. PATENT DOCUMENTS

| | | | |
|---|---|---|---|
| 2010/0269109 A1* | 10/2010 | Cartales | 718/1 |
| 2010/0332657 A1 | 12/2010 | Elyashev et al. | |
| 2010/0332658 A1 | 12/2010 | Elyashev | |
| 2011/0004735 A1 | 1/2011 | Arroyo et al. | |
| 2011/0060832 A1 | 3/2011 | Govil et al. | |
| 2011/0106949 A1 | 5/2011 | Patel et al. | |
| 2011/0119427 A1 | 5/2011 | Dow et al. | |
| 2011/0119670 A1 | 5/2011 | Sugumar et al. | |
| 2011/0131568 A1 | 6/2011 | Heim | |
| 2011/0225277 A1 | 9/2011 | Freimuth et al. | |
| 2011/0314470 A1 | 12/2011 | Elyashev et al. | |

OTHER PUBLICATIONS

USPTO, Office Action for U.S. Appl. No. 12/627,950 mailed Mar. 22, 2012.

USPTO, Final Office Action for U.S. Appl. No. 12/627,950 mailed Oct. 12, 2012.

USPTO, Advisory Action for U.S. Appl. No. 12/627,950 mailed Dec. 20, 2012.

USPTO, Notice of Allowance for U.S. Appl. No. 12/627,929 mailed Apr. 20, 2012.

USPTO, Corrected Notice of Allowance for U.S. Appl. No. 12/627,929 mailed Jun. 7, 2012.

USPTO, Notice of Allowance for U.S. Appl. No. 12/627,929 mailed Jul. 30, 2012.

USPTO, Office Action for U.S. Appl. No. 12/627,933 mailed Jul. 3, 2012.

USPTO, Final Office Action for U.S. Appl. No. 12/627,933 mailed Nov. 20, 2012.

USPTO, Office Action for U.S. Appl. No. 12/852,258 mailed Sep. 5, 2012.

USPTO Notice of Allowance for U.S. Appl. No. 12/627,950 mailed May 16, 2013.

USPTO, Advisory Action for U.S. Appl. No. 12/627,933 mailed Feb. 12, 2013.

USPTO, Office Action for U.S. Appl. No. 12/627,933 mailed Mar. 12, 2013.

USPTO, Final Office Action for U.S. Appl. No. 12/852,258 mailed Feb. 6, 2013.

USPTO, Advisory Action for U.S. Appl. No. 12/852,258 mailed Apr. 11, 2013.

* cited by examiner

METHOD AND SYSTEM FOR TARGET HOST OPTIMIZATION BASED ON RESOURCE SHARING IN A LOAD BALANCING HOST AND VIRTUAL MACHINE ADJUSTABLE SELECTION ALGORITHM

RELATED APPLICATION

The present application is related to co-filed U.S. patent application Ser. No. 12/627,933 entitled "A Mechanism for Load Balancing in a Memory-Constrained Virtualization System", which is assigned to the assignee of the present application.

TECHNICAL FIELD

The embodiments of the invention relate generally to virtual machine (VM) systems and, more specifically, relate to a mechanism for target host optimization in a load balancing host and virtual machine (VM) selection algorithm.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

A virtualization system is a dynamic system. A change in load (e.g., set of resources consumed) on a host, or the balance of load on hosts in the system, can occur because VMs are scheduled to start in different points in time in the system or because VMs stop running in different points in time in the system. Even without any change in how VMs are running on each host, the load created by VMs on each host can vary in several metrics causing unbalanced load. Most commonly, the amount of CPU, memory and I/O required by each VM varies as it performs different tasks.

A load balancing algorithm may be used in such a system to try and balance the load on the different hosts in the system, usually by moving VMs from highly-utilized hosts to less-utilized hosts. This process improves the health of the system, as it prevents a disturbance in the level of service provided by hosts to the virtual machines running on them. A load balancing algorithm for a virtualization system that takes into account a variety of other considerations for load balancing would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
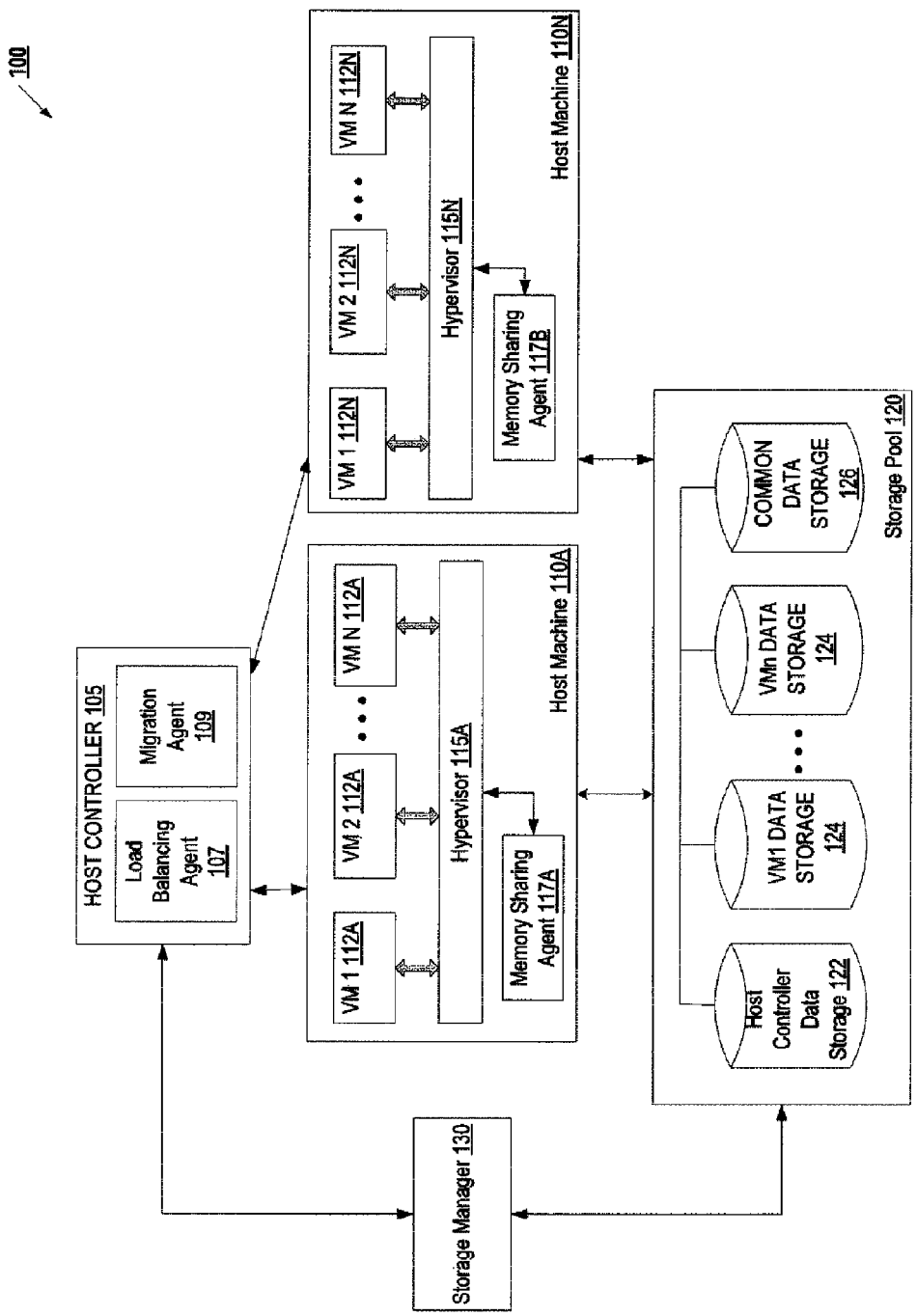
FIG. 1 is a block diagram of an exemplary virtualization architecture in which embodiments of the present invention may operate.

Embodiments of the invention provide a mechanism for target host optimization in a load balancing host and virtual machine (VM) selection algorithm. A method of embodiments of the invention includes determining that one or more collected metrics have triggered a load balancing operation of a host controller machine, identifying a plurality of source host machines and a plurality of virtual machines (VMs) hosted by the plurality of source host machines as candidates for selection by the load balancing operation for migration, and adjusting a selection score for at least one of a candidate source host machine and a candidate VM based on one or more metrics of the candidate source host and of the candidate VM, wherein the one or more metrics are associated with one or more candidate target host machines to which a candidate VM could be migrated.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for target host optimization in a load balancing host and VM selection algorithm. A load balancing algorithm detects whether a set of criteria has been met, thereby triggering a need move a VM to another host. For purposes of the following description, assume that the source host is the host machine that a VM is migrated from, while a target host is the host machine a VM is migrated to. The load balancing algorithm selects the source host to perform the migration from and then also selects the VM to migrate from the source host. Embodiments of the invention provide for a target host optimization that takes into consideration the various candidate target hosts for migration when selecting the source host to migrate from and the VM to migrate from that source host.

FIG. 1 illustrates an exemplary virtualization architecture 100 in which embodiments of the present invention may operate. The virtualization architecture 100 may include one or more host machines 110A, 110N to run one or more virtual machines (VMs) 112A, 112N. Each VM 112A, 112N runs a guest operating system (OS) that may be different from one another. The guest OS may include Microsoft Windows, Linux, Solaris, Mac OS, etc. The host 110A, 110N may include a hypervisor 115A, 1125N that emulates the underlying hardware platform for the VMs 112A, 112N. The hypervisor 115A, 115N may also be known as a virtual machine monitor (VMM), a kernel-based hypervisor or a host operating system.

In one embodiment, each VM 112A, 112N may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110A, 110N as a local client. In one scenario, the VM 112A, 112N provides a virtual desktop for the client.

As illustrated, the host 110A, 110N may be coupled to a host controller 105 (via a network or directly). In some embodiments, the host controller 105 may reside on a designated computer system (e.g., a server computer, a desktop computer, etc.) or be part of the host machine 110A, 110N or another machine. The VMs 112A, 112N can be managed by the host controller 105, which may add a VM, delete a VM, balance the load on the server cluster, provide directory service to the VMs 131, and perform other management functions.

The host 110A, 110N may also be coupled to a data storage pool 120. Data storage pool 120 may represent multiple storage devices (e.g., disks in a disk array) or a single storage device (e.g., a hard drive of the host 110A, 110N or host controller 105). In one embodiment, the storage pool 120 includes storage areas 124 designated for individual VMs 112A, 112N. When a VM 112A, 112N is created, it is associated with its own individual data storage 124, which may be an independent storage device or a designated area of a single storage device. The host 110A, 110N may further be associated with common data storage 126 of the data storage pool 120, directly or remotely. Common data storage 126 may represent an independent storage device (e.g., a disk drive) or a remote storage device (e.g., network attached storage (NAS), etc.). Data storage pool 120 may also include areas 122 designated for use by the host controller 105, which may also be an independent storage device or a designated area of a single storage device. Although shown as a single storage pool, those skilled in the art will appreciate that data storage pool 120 may be multiple, independent storage devices in dispersed locations that are logically pooled together and managed by storage manager 130.

In many cases, a VM 112A, 112N may run an OS and processes that utilize the same memory image as other VMs. In such cases, a process of the host machine 110A, 110N may be used to optimize memory utilization on the host, by referencing identical memory pages from multiple VMs to the same single memory page. This is known as memory sharing. In one embodiment, each host 110A, 110N includes a memory sharing agent 117A, 117N that operates to unify shared pages of VMs 112A, 112N running on that host 110A, 110N. In one embodiment, the memory sharing agent 117A, 117N is a Kernel SamePage Merging (KSM) feature of a Linux kernel running in host machine 110A, 110N. Instead of each VM 112A, 11N storing identical memory pages in their separate data storage 122, the memory sharing agent 117A, 117N can identify these shared pages and store one copy of these memory pages in the common data storage 124 that may be accessed by each VM 112A, 112N. Memory sharing reduces the amount of memory required in the host when running VMs with shared memory. Thus, virtualization system 100 would benefit from a load balancing algorithm optimized to consider memory as a factor.

In one embodiment, host controller 105 may include a load balancing agent 107. Load balancing agent 107 is responsible for balancing the load between different host machines 110A, 110N in virtualization system 100. Typically, a load balancing algorithm detects whether a set of criteria has been met, and if so, the algorithm triggers an operation to relocate a VM 112A, 112N to another host 110A, 110N. As part of the operation to relocate, the load balancing algorithm selects a host machine 110A, 110N to perform the migration from, and then selects a VM 112A, 112N of that host machine to be migrated. Once the load balancing agent 107 has selected a host 110A, 110N and VM 112A, 112N to be load balance migrated, control is passed to a migration agent 109 to select the host 110A, 110N that the selected VM 112A, 112N should be migrated to and handle the migration process between those hosts 110A, 110N.

Embodiments of the invention provide for a target host optimization as part of the selection of the source host machine 110A, 110N and VM 112A, 112N to be load balance migrated in the load balancing algorithm described above. The target host optimization causes the selection portion of the load balancing algorithm to take into consideration the various candidate target hosts 110A, 110N for migration when selecting the host 110A, 110N to migrate from and the VM 112A, 11N to migrate. The target host optimization of embodiments of the invention may take into consideration the state of a specific host 110A, 110N or of all hosts in the system.

In one embodiment, the target host optimization may be extended to weigh the level of memory sharing each VM has with the candidate target hosts. The memory sharing of each candidate VM with the VMs currently running on each candidate target host is checked by examining the shared memory history that the candidate VM has with those target host VMs. In one exemplary embodiment, the VM selection algorithm may be extended so that each of the top X (absolute) or Y percent of candidate VMs to migrate are checked for their potential memory sharing with the top W (absolute) or Z percent of the candidate target hosts.

For example, in one embodiment, the VM selection algorithm may be extended so that each of the top 3 candidate VMs to migrate are checked for their potential memory sharing with the top 5 candidate target host machines. In another example embodiment, the VM selection algorithm may be extended so that each of the top 20% of candidate VMs to migrate are checked for their potential memory sharing with the top 10% of candidate target host machines. In some embodiments, the selection algorithm may give a higher weight to the memory sharing with the target host VMs if the overall system, or in some cases if individual candidate hosts, are memory constrained (to improve memory sharing and reduce memory utilization).

In another embodiment of the invention, the target host optimization may be based on a shared template optimization. In this case, the VM selection algorithm may be extended to weigh the level of template reuse each candidate VM has with the candidate target hosts. In one embodiment, the VM selection algorithm may operate so that each of the top X (absolute) or Y percent of candidate VMs to migrate are checked for the number of VMs that are based on the same template with the top W (absolute) or Y percent of the candidate target hosts. In some embodiments, the selection algorithm may give a higher weight if the overall system, or in some cases if individual candidate hosts, are I/O constrained (as using same template may benefit from having the template blocks cached for multiple guests, and reduce I/O utilization).

In yet another embodiment, the target host optimization may be based on a shared network optimization. In this case, the VM selection algorithm may be extended to weigh the actual network traffic occurring between the candidate VM, and the other VMs running on the candidate target hosts, based on a collected history of network traffic amongst VMs. In one embodiment, the VM selection algorithm may be extended so that each of the top X (absolute) or Y percent of candidate VMs to-be-migrated are each examined to determine which ones are assigned to the same logical network as the top W (absolute) or Z percent of the candidate target hosts. The selection algorithm may give a higher weight if the overall system, or in some cases if individual candidate hosts, are network constrained (as having VMs which communicate frequently over the network and reside on same host reduces the network utilization required on the external network). The selection algorithm may also take into consideration network traffic between VMs occurring on different logical networks if local routing is supported, allowing a host to route network traffic between VMs on different logical networks.

One skilled in the art will appreciate that embodiments of the invention may include any of the above-described target host optimizations individually or in combination.

Figure 2:
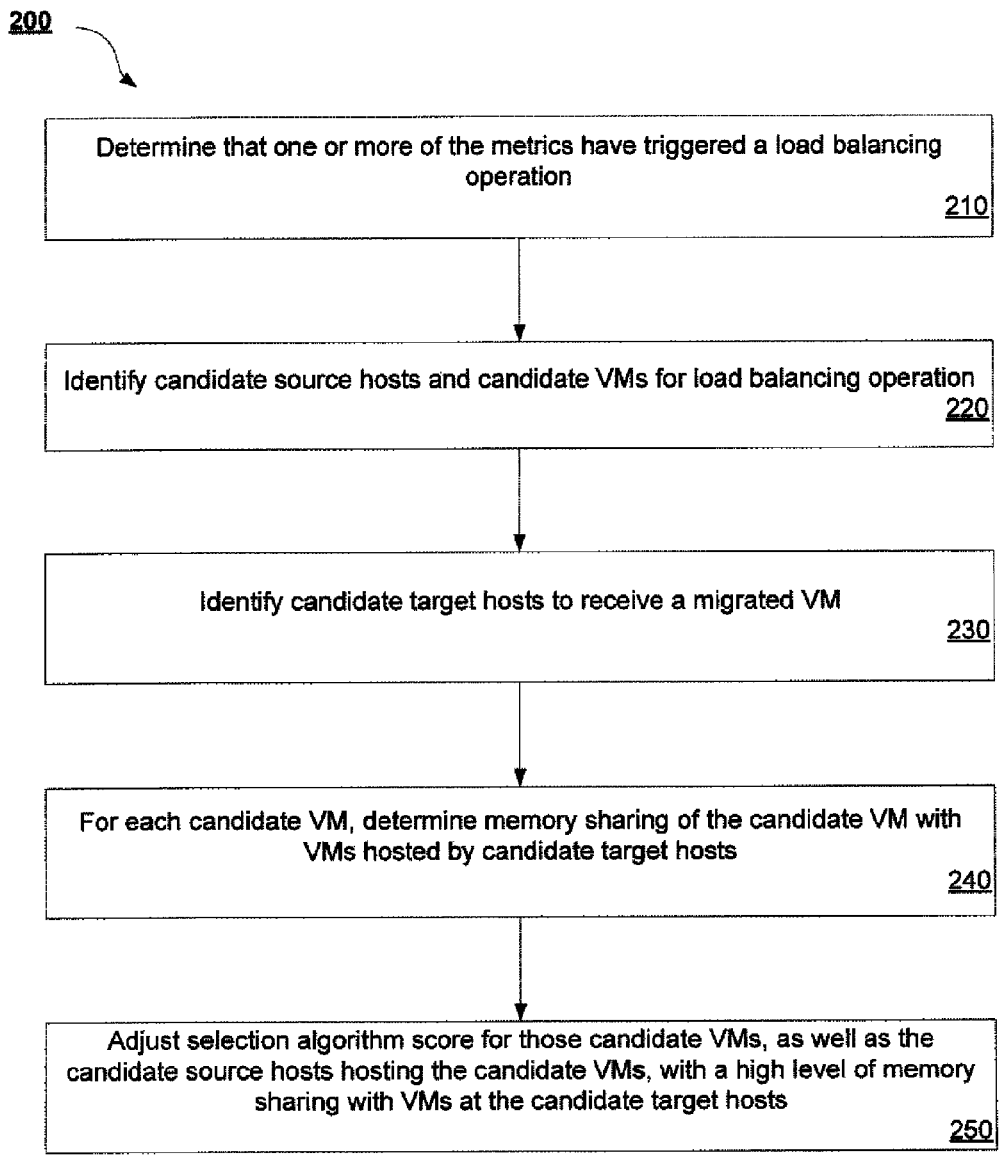
FIG. 2 is a flow diagram illustrating a method for target host optimization based on shared memory in a load balancing host and VM selection algorithm.

FIG. 2 is a flow diagram illustrating a method 200 for target host optimization based on shared memory in a load balancing host and VM selection algorithm according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by load balancing agent 107 described with respect to FIG. 1.

Method 200 begins at block 210 where it is determined that one or more metrics have triggered a load balancing operation. Then, at block 220, one or more candidate source hosts and candidate VMs are identified for the load balancing operation. In addition, one or more candidate target hosts to receive a migrated VM are also identified at block 230.

Subsequently, at block 240, for each identified candidate VM, the memory sharing of that candidate VM with one or more VMs hosted by each candidate host is determined. In one embodiment, this determination may only be performed for the top X (absolute) or Y percent of candidate VMs with the top W (absolute) or Y percent of the candidate target hosts. In some embodiments, the memory sharing is based on shared memory history statistics collected over time for the VMs in question.

At block 250, a selection algorithm score is adjusted for the candidate VMs, and their associated candidate source hosts, that have a high level of memory sharing with VMs at the candidate target hosts. In one embodiment, the adjustment may include increasing the score for the candidate VM in the selection algorithm by a predetermined amount depending on what the weighting is for the memory sharing metric in the selection algorithm. In some cases, the selection algorithm may give a higher weight to the memory sharing metric if the overall system (or, in some cases, if one or more individual candidate hosts) are memory constrained, and vice versa. One skilled in the art will appreciate that there are a variety of ways to determine the level of memory sharing and embodiments of the invention are not limited to a single determination.

Figure 3:
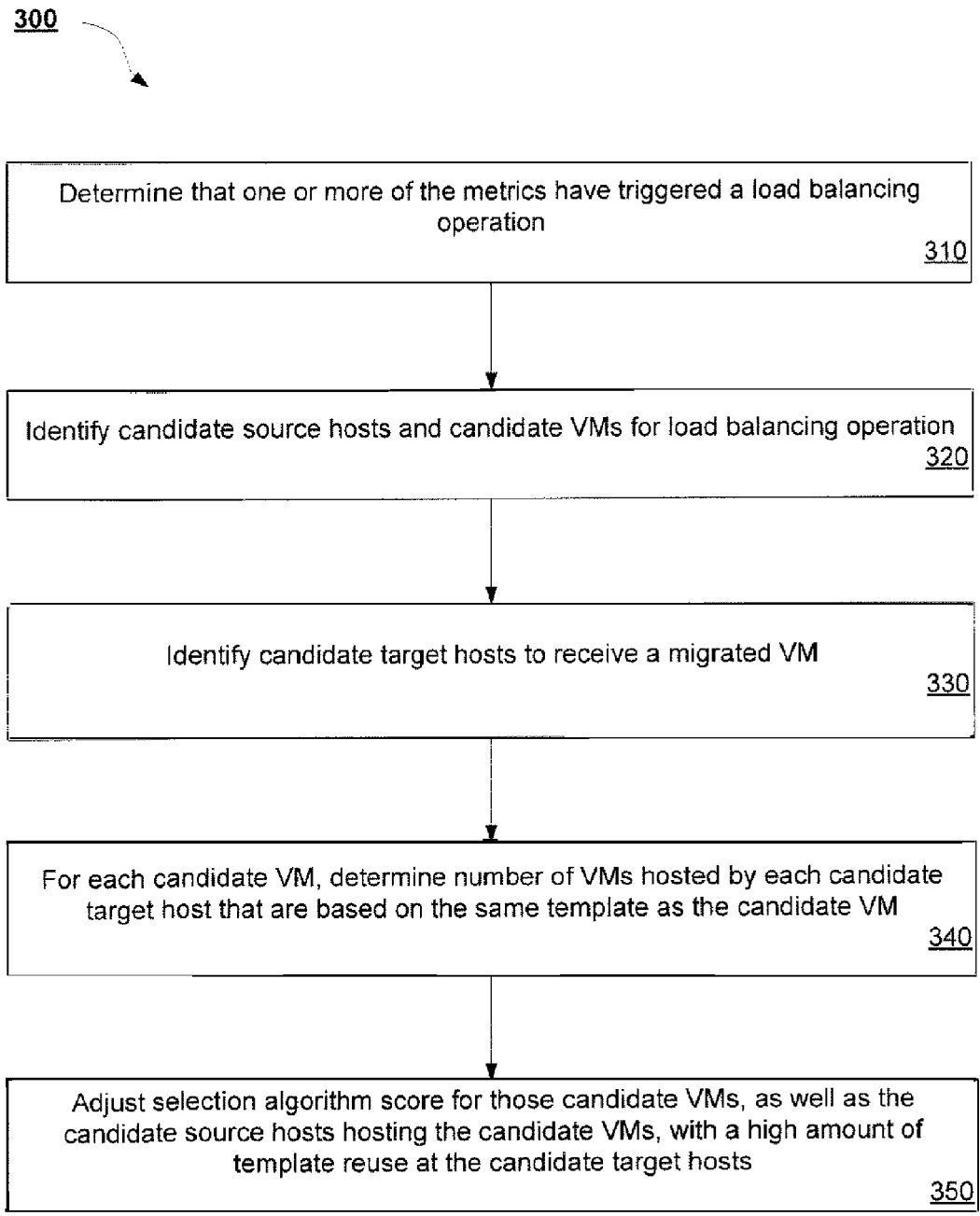
FIG. 3 is a flow diagram illustrating a method for target host optimization based on shared templates in a load balancing host and VM selection algorithm.

FIG. 3 is a flow diagram illustrating a method 300 for target host optimization based on shared templates in a load balancing host and VM selection algorithm according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by load balancing agent 107 described with respect to FIG. 1.

Method 300 begins at block 310 where it is determined that one or more metrics have triggered a load balancing operation. Then, at block 320, one or more candidate source hosts and candidate VMs are identified for the load balancing operation. In addition, one or more candidate target hosts to receive a migrated VM are also identified at block 330.

Subsequently, at block 340, for each candidate VM, a number of VMs hosted by each candidate target hosts that are based on the same template as the candidate VM is determined. In one embodiment, this determination may be performed on solely the top X (absolute) or Y percent of candidate VMs against the top W (absolute) or Y percent of the candidate target hosts.

At block 350, a selection algorithm score is adjusted for the candidate VMs, and their associated candidate source hosts, that have a large amount of template reuse at the candidate target hosts. In some embodiments, the VM with the largest amount of template reuse may be the VM that has the largest number of template matches with other VMs on a single candidate target host. In another embodiment, the VM with the largest amount of template reuse may be the VM that has the largest number of template matches with other VMs overall on all candidate target hosts. In some embodiments, the selection algorithm may give a higher weight to this shared template metric if the overall system, or if one or more individual candidate hosts, are I/O constrained. One skilled in the art will appreciate that there are a variety of ways to determine the largest amount of template reuse and embodiments of the invention are not limited to a single determination.

Figure 4:
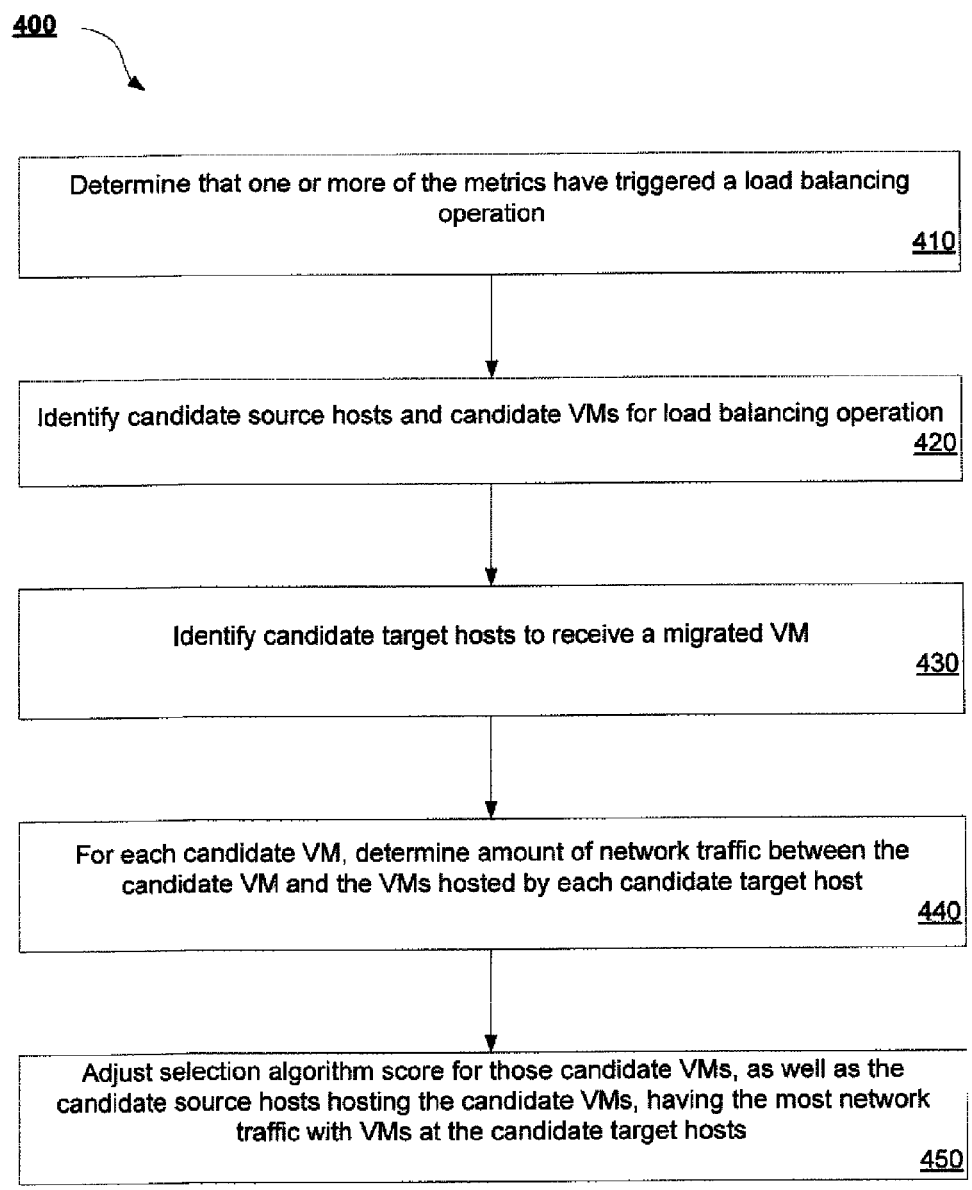
FIG. 4 is a flow diagram illustrating a method for target host optimization based on shared networks in a load balancing host and VM selection algorithm.

FIG. 4 is a flow diagram illustrating a method 400 for target host optimization based on shared networks in a load balancing host and VM selection algorithm according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by load balancing agent 107 described with respect to FIG. 1.

Method 400 begins at block 410 where it is determined that one or more metrics have triggered a load balancing operation. Then, at block 420, one or more candidate source hosts and candidate VMs are identified for the load balancing operation. In addition, one or more candidate target hosts to receive a migrated VM are also identified at block 430.

Subsequently, at block 440, for each candidate VM, the amount of traffic between the VMs hosted by each candidate target host with the candidate VM is determined. In one embodiment, this determination may be performed on solely the top X (absolute) or Y percent of candidate VMs against the top W (absolute) or Y percent of the candidate target hosts. This determination aims to place the candidate VM on a candidate target host that exchanges the most traffic with the candidate VM in order to reduce network traffic. In some embodiments, the selection algorithm may also take into consideration network traffic between VMs occurring on different logical networks, if local routing is supported, allowing a host to route network traffic between guests on different logical networks. In embodiments of the invention, the network traffic information is determined from a history of network statistics collected over time for the VMs in question.

At block 450, a selection algorithm score is adjusted for the candidate VMs, and their associated candidate source hosts, that have the most traffic with VMs at the candidate target hosts. In some embodiments, the candidate VM with the most network traffic may be the VM that has the largest number of network traffic with other VMs on a single candidate target host. In some embodiments, the selection algorithm may give a higher weight to this shared network traffic metric if the overall system, or if one or more individual candidate hosts, are network constrained. One skilled in the art will appreciate that there are a variety of ways to determine the highest network traffic amounts and embodiments of the invention are not limited to a single determination.

Figure 5:
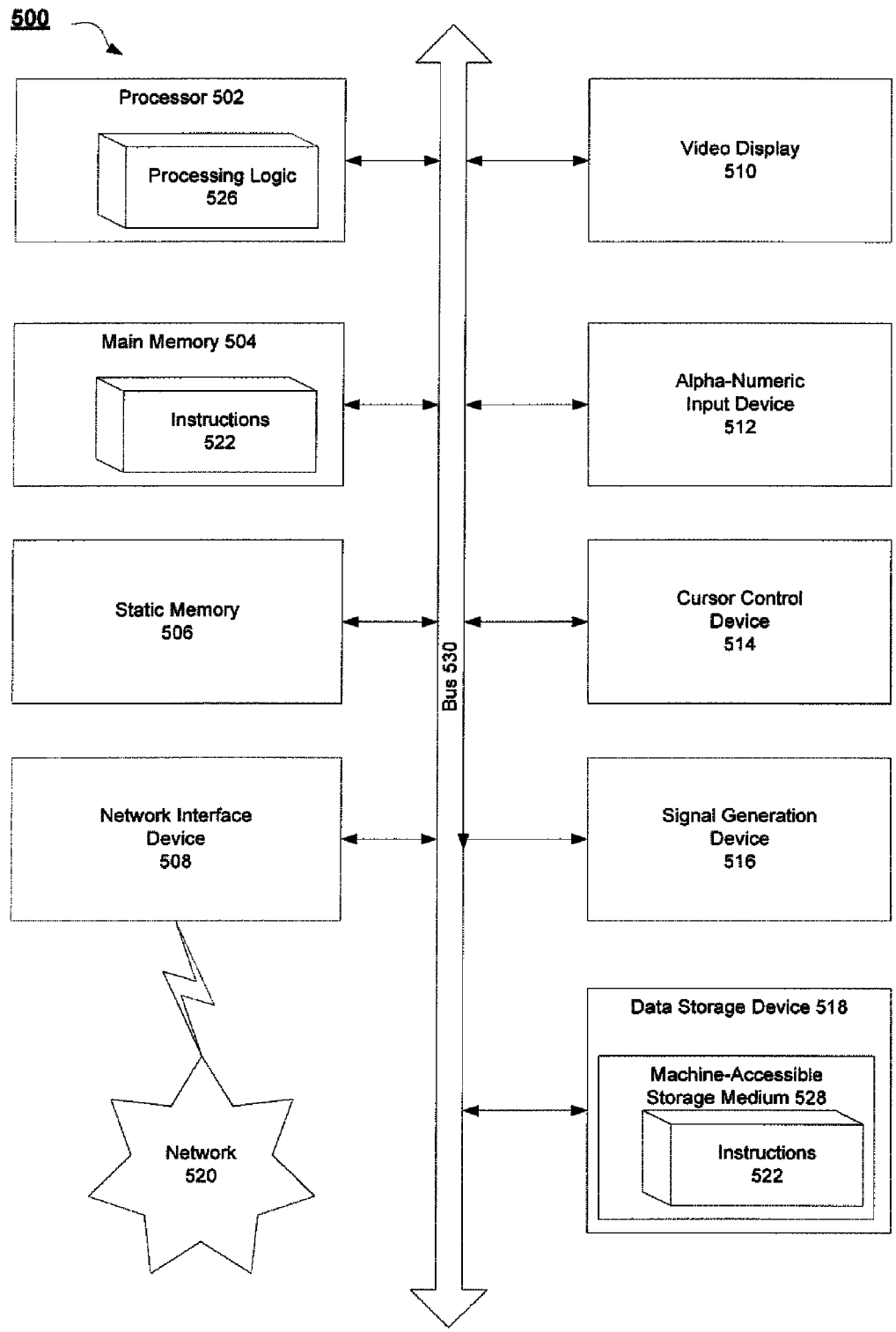
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform target host optimization in a load balancing host and VM selection algorithm by a load balancing agent 107 as described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform target host optimization in a load balancing host and VM selection algorithm of methods 200, 300, and 400 described with respect to FIGS. 2 through 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    determining, by a host controller machine, that a load balancing operation is triggered, the load balancing operation performed by the host controller machine;
    identifying, by the host controller machine, source host machines and virtual machines (VMs) hosted by the source host machines, the VMs comprising candidates for migration in the load balancing operation;
    for each of a subset of the VMs, adjusting, by the host controller machine, a selection score for the VM based on one or more metrics of the VM and of the source host hosting the VM, wherein the one or more metrics measure a shared resource between the VM and a target host machine that is a candidate to host the VM, wherein the subset of VMs comprises at least one of a predetermined number of the VMs or a predetermined percentage of the VMs in terms of selection scores of the VMs, and wherein the selection score is adjusted to be proportionally related to a level of sharing of the shared resource between the VM and the target host machine by:
        determining a number of the subset of VMs hosted by each target host machine comprising the shared resource; and
        increasing the selection score for the VM and the candidate source host machine hosting that VM with a highest amount of shared resource at the candidate target host machines; and
    selecting, by the host controller machine, a VM of the VMs comprising a highest selection score, wherein the selected VM is migrated as part of the load balancing operation.

2. The method of claim 1, wherein the one or more metrics comprise shared memory history.

3. The method of claim 2, wherein the adjusting the selection score comprises:
    determining a memory sharing history of each of the VMs with each VM hosted by each target host machine that is a candidate to host the VM; and
    for each of the VMs, adjusting the selection score for the VM, as well as the candidate source host machine hosting that VM, with a highest level of memory sharing history.

4. The method of claim 1, wherein the one or more metrics comprise shared templates.

5. The method of claim 4, wherein the adjusting the selection score comprises, for each of the VMs:
    determining a number of VMs hosted by each target host machine that are initialized using a same template as the VM; and
    adjusting the selection score for the VM, as well as the candidate source host machine hosting that VM, with a highest amount of template reuse at the candidate target host machine.

6. The method of claim 1, wherein the one or more metrics comprise shared logical network assignment.

7. The method of claim 6, wherein the adjusting the selection score comprises, for each of the VMs:
    determining an amount of network traffic communicated between VMs hosted by each candidate target host machine and the VM; and
    adjusting the selection score for the VM, as well as for the candidate source host machine hosting that VM, with a largest amount of network traffic with the VMs at the candidate target host machine.

8. The method of claim 1, wherein the adjusting the selection score is performed for at least one of a top predetermined number or a top predetermined percentage of candidate VMs based on the one or more metrics for at least one of a top predetermined number or a top predetermined percentage of the one or more candidate target host machines.

9. A system, comprising:
    a memory;
    a processing device communicably coupled to the memory; and
    a virtual machine (VM) load balancing agent executable from the memory and the processing device, the VM load balancing agent to:
        determine that a load balancing operation is triggered, the load balancing operation performed by the host controller machine;
        identify source host machines and virtual machines (VMs) hosted by the source host machines, the VMs comprising candidates for migration in the load balancing operation;
        for each of the VMs, adjust a selection score for the VM based on one or more metrics of the VM and of the source host hosting the VM, wherein the one or more metrics measure a shared resource between the VM and a target host machine that is a candidate to host the VM, wherein the subset of VMs comprises at least one of a predetermined number of the VMs or a predetermined percentage of the VMs in terms of selection scores of the VMs, and wherein the selection score is adjusted to be proportionally related to a level of sharing of the shared resource between the VM and the target host machine by:

determining a number of the subset of VMs hosted by each target host machine comprising the shared resource; and increasing the selection score for the VM and the candidate source host machine hosting that VM with a highest amount of shared resource at the candidate target host machines; and select a VM of the VMs comprising a highest selection score, wherein the selected VM is migrated as part of the load balancing operation.

10. The system of claim 9, wherein the one or more metrics comprise shared memory history.

11. The system of claim 10, the VM load balancing agent to adjust the selection score further comprises the VM load balancing agent to:

determine a memory sharing history of each of the VMs with each VM hosted by each target host machine that is a candidate to host the VM; and for each of the VMs, adjust the selection score for the VM, as well as the candidate source host machine hosting that VM, with a highest level of memory sharing history.

12. The system of claim 9, wherein the one or more metrics comprise shared templates.

13. The system of claim 12, wherein the VM load balancing agent to adjust the selection score further comprises the VM load balancing agent to, for each of the VMs:

determine a number of VMs hosted by each target host machine that are initialized using a same template as the VM; and adjust the selection score for the VM, as well as the candidate source host machine hosting that VM, with a highest amount of template reuse at the candidate target host machine.

14. The system of claim 9, wherein the one or more metrics comprise shared logical network assignment.

15. The system of claim 14, wherein the VM load balancing agent to adjust the selection score further comprises the VM load balancing agent tom for each of the VMs:

determine an amount of network traffic communicated between VMs hosted by each candidate target host machine and the VM; and adjust the selection score for the VM, as well as for the candidate source host machine hosting that VM, with a largest amount of network traffic with the VMs at a candidate target host machine.

16. A non-transitory machine-readable storage medium including data that, when accessed by a processing device, cause the processing device to perform operations comprising:

determining, by the processing device of a host controller machine, that a load balancing operation is triggered, the load balancing operation performed by the host controller machine;

identifying, by the host controller machine, source host machines and virtual machines (VMs) hosted by the source host machines, the VMs comprising candidates for migration in the load balancing operation;

for each of a subset of the VMs, adjusting, by the host controller machine, a selection score for the VM based on one or more metrics of the VM and of the source host hosting the VM, wherein the one or more metrics measure a shared resource between the VM and a target host machine that is a candidate to host the VM, wherein the subset of VMs comprises at least one of a predetermined number of the VMs or a predetermined percentage of the VMs in terms of selection scores of the VMs, and wherein the selection score is adjusted to be proportionally related to a level of sharing of the shared resource between the VM and the target host machine by:

determining a number of the subset of VMs hosted by each target host machine comprising the shared resource; and increasing the selection score for the VM and the candidate source host machine hosting that VM with a highest amount of shared resource at the candidate target host machines; and selecting, by the host controller machine, a VM of the VMs comprising a highest selection score, wherein the selected VM is migrated as part of the load balancing operation.

17. The non-transitory machine-readable storage medium of claim 16, wherein the one or more metrics comprise shared memory history.

18. The non-transitory machine-readable storage medium of claim 17, wherein adjusting the selection score further comprises:

determining a memory sharing history of each of the-VMs with each VM hosted by each target host machine that is a candidate to host the VM; and for each of the VMs, adjusting the selection score for the VM, as well as the candidate source host machine hosting that VM, with a highest level of memory sharing history.

19. The non-transitory machine-readable storage medium of claim 16, wherein the one or more metrics comprise shared templates.

20. The non-transitory machine-readable storage medium of claim 16, wherein the one or more metrics comprise shared logical network assignment.

* * * * *

UNITED STATES PATENT AND TRADEMARK OFFICE
CERTIFICATE OF CORRECTION

| | | |
|---|---|---|
| PATENT NO. | : 8,589,921 B2 | Page 1 of 1 |
| APPLICATION NO. | : 12/627943 | |
| DATED | : November 19, 2013 | |
| INVENTOR(S) | : Itamar Heim | |

It is certified that error appears in the above-identified patent and that said Letters Patent is hereby corrected as shown below:

In the Claims

In claim 15, column 11, line 44, delete "tom" and insert --to,--.

Signed and Sealed this
Fifteenth Day of April, 2014

Michelle K. Lee
*Deputy Director of the United States Patent and Trademark Office*